April 5, 1960     C. W. JOHNSTONE     2,931,570

$N^2$ SCALER

Filed June 14, 1957     5 Sheets-Sheet 1

WITNESSES:

INVENTOR.
Charles W. Johnstone
BY

April 5, 1960 C. W. JOHNSTONE 2,931,570
N² SCALER
Filed June 14, 1957 5 Sheets-Sheet 3

WITNESSES:

INVENTOR.
Charles W. Johnstone
BY

April 5, 1960

C. W. JOHNSTONE 2,931,570

N² SCALER

Filed June 14, 1957

WITNESSES:

INVENTOR.
Charles W. Johnstone
BY

Fig. 7

United States Patent Office 2,931,570
Patented Apr. 5, 1960

2,931,570

N² SCALER

Charles Wilkin Johnstone, Houston, Tex., assignor to the United States of America as represented by the United States Atomic Energy Commission Application June 14, 1957, Serial No. 665,872

7 Claims. (Cl. 235—164)

This invention relates to binary counting devices and more particularly to a binary counting system which gives the squared numerical value of occurring events as well as the direct numerical count of such events.

A numerical squaring device is useful for solving any problem involving the square of a measurement or a number, but has particular value in connection with nuclear engineering.

In the operation of nuclear reactors, such as, for example, of the types described in the Review of Scientific Instruments, vol. 22, No. 7, pp. 489–499 for July 1951, and in Nucleonics, vol. 13, No. 11, pp. 72–75, November 1955, it is important to know the state of criticality as the power output of the reactor is being adjusted. A nuclear detector used in conjunction with such a reactor generates pulses or "counts" at a rate which varies considerably over any given time interval. These fluctuations in the rate of pulse generation are attributed to the fact that the nuclear reactions are of statistical nature. This being so, it has been found that the expression $$\frac{\overline{N^2} - (\overline{N})^2}{\overline{N}}$$

is a convenient measure of the fluctuations where N is the number of counts recorded in each of a plurality of measuring intervals, and $\overline{N}$ is the sum of the number of counts recorded over a plurality of equal measuring intervals divided by the number of measuring intervals. In other words $\overline{N}$ is the average number of counts in a measuring interval.

The expression $$\frac{\overline{N^2} - (\overline{N})^2}{\overline{N}}$$

is used in the randomness equation $$\frac{\overline{N^2} - (\overline{N})^2}{\overline{N}} = 1 + Y$$

Y is zero for a purely Poisson distribution and has a value above zero in the case of a nuclear chain reaction. It follows that a counting system which can quickly give the numerical value of $$\frac{\overline{N^2} - (\overline{N})^2}{\overline{N}}$$

and therefor Y is of great value in knowing and adjusting the state of criticality of a reactor.

Further information showing the derivation and importance of the above given equations is presented in "The Science and Engineering of Nuclear Power," vol. 2, published by Addison Wesley Press, Inc., pages 115 through 119, the subject matter in which is hereby incorporated by reference.

Apparatus for convenient utilization of the randomness formula requires that it count the output pulses of a nuclear detector for each of many discrete and equal durations and that a tally be registered of both the total number of counting durations or cycles and the total number of pulses for all the durations. In addition the apparatus must square the number of pulses per counting duration and accumulate a summation of the squared numerical values over the total number of counting durations.

It is accordingly the prime objective of the present invention to provide the apparatus for accomplishing these counting and registering operations.

Further objectives and advantages of this invention will become clear from the following description of a preferred embodiment explained with reference to the appended drawings made a part of the specification and in which.

Figure 3:
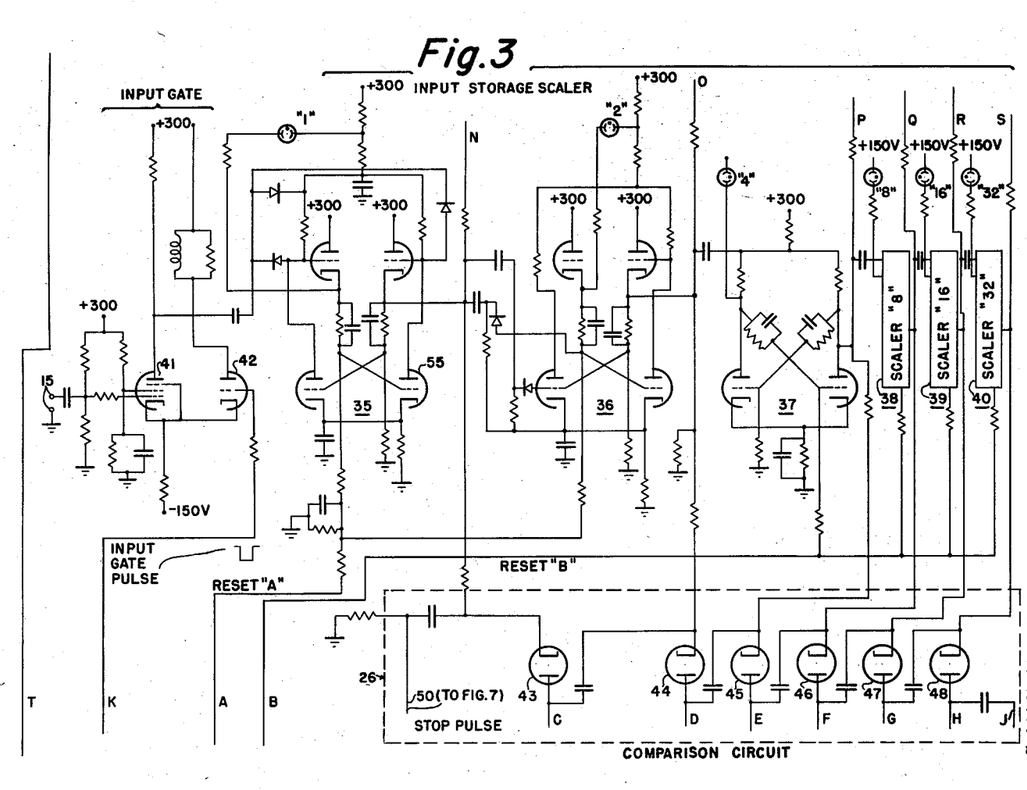
Figure 3 is a schematic diagram of the input storage scaler, input gate and comparison circuit.
Figure 4:
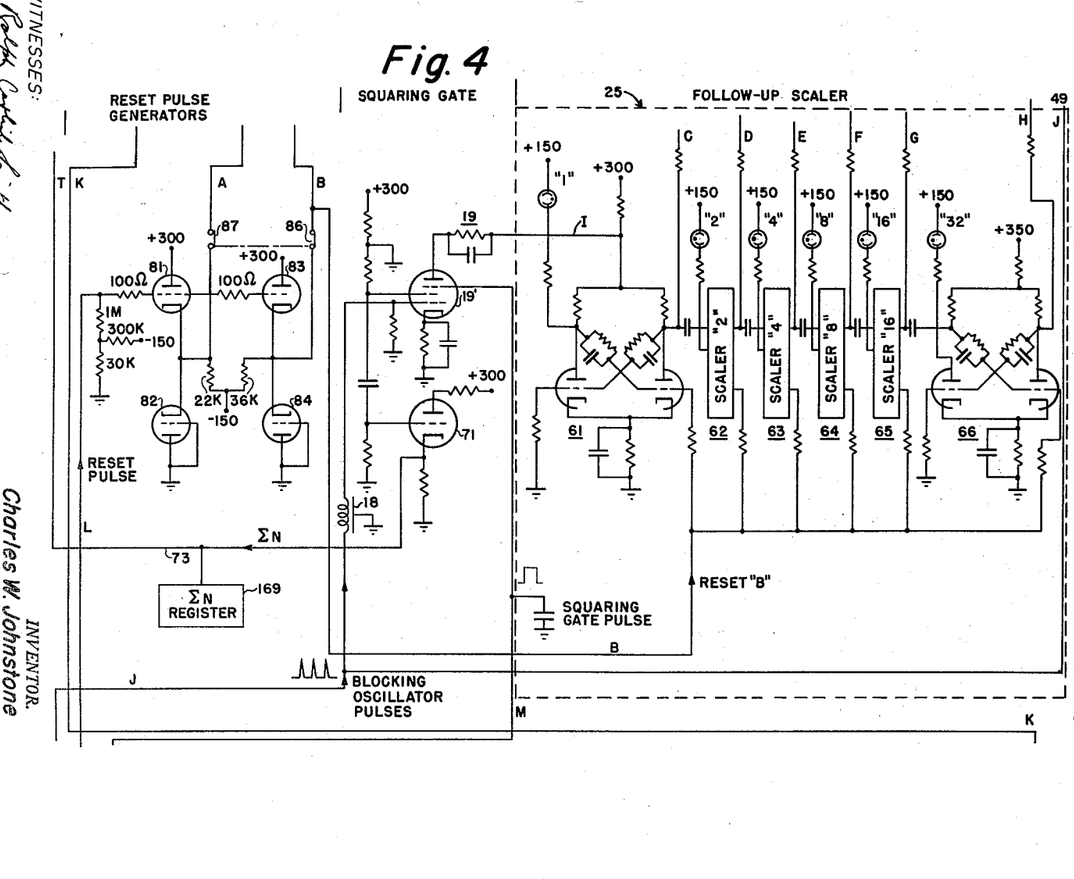
Figure 4 is a schematic diagram of the follow-up scaler.
Figure 5:
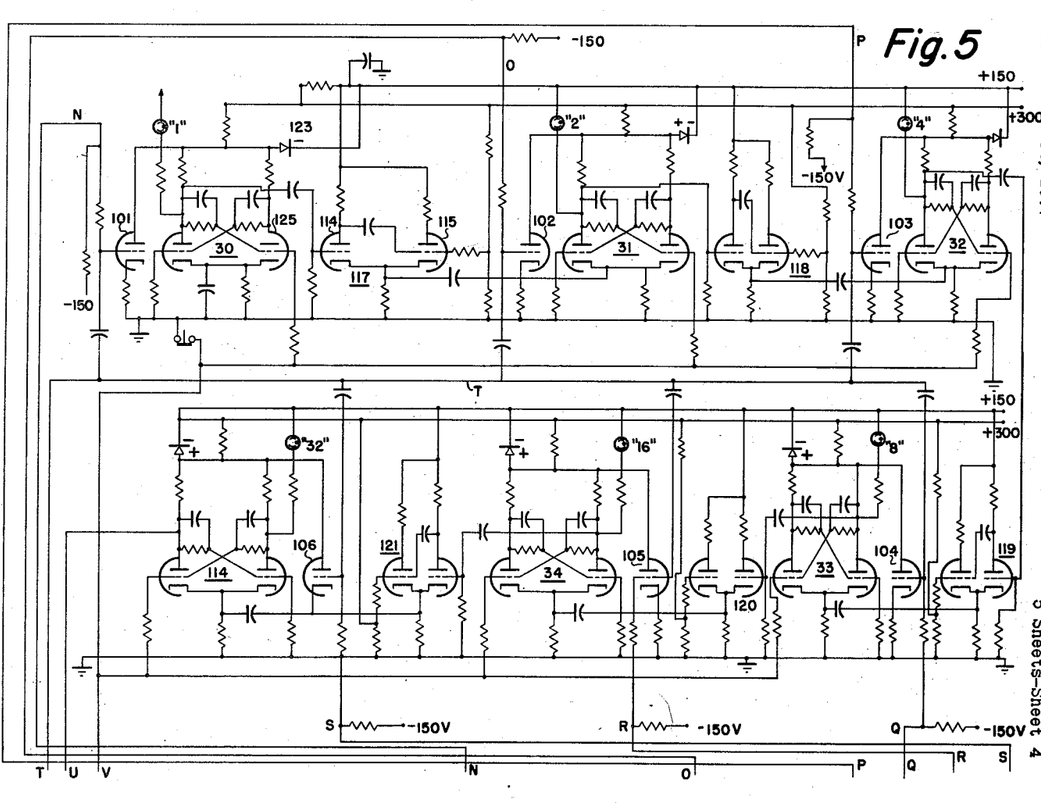
Figure 5 is a schematic diagram of transfer gates and part of the squaring scaler.

Figures 3, 4 and 5 are arranged to provide a continuous diagram when Fig. 5 is aligned with the top of Figure 3, and Figure 4 is aligned with the bottom of Figure 3. In addition several connections, viz., U and V of Figure 5 connect with corresponding conductors in Figure 6, connections J, L, M, and K of Figure 4 connect with conductors J, L, M, and K of Figure 7, and conductor 50 of Figure 3 connects with conductor 50 of Figure 7.

The preferred embodiment illustrated in the drawing has an input storage binary scaler with a capacity of 64 and a squaring binary scaler with a capacity of 4096. The remainder of the system is tailored to the input capacity of 64, but it is understood that the system can be modified to accept and process an input count of any selected magnitude.

*The system*

A preferred embodiment of the apparatus of this invention and the sequence of operations is explained with reference to Figures 1 and 2. An input gate 13 is connected between an input storage scaler 11 consisting of six binary stages 35–40, and input terminals 15. Terminals 15 are adapted to be connected to a source of input pulses (such as from a nuclear detector).

The input gate is rendered conductive by the leading edge of an input gate pulse b (see Figure 2) for the selected duration and closes at the end of the input gate pulse. During the input gate pulse the input storage scaler accumulates a count corresponding to the number of input pulses received during the input gate pulse. After the count duration a squaring gate pulse c opens "squaring" gate 19. Pulses "a" from blocking oscillator and timer 17 are conducted through delay line 18, squaring gate 19 and line T to the transfer gates 23 and through line I to the follow-up scaler 25 consisting of six stages 61–66 and through line J to the comparison circuit 26. Each pulse from the blocking oscillator passes through those transfer gates which are "gated-on" by those of the corresponding input storage scaler stages which contain a "1." Consequently each blocking oscillator pulse results in a number corresponding to the total count in the input storage scaler being injected into the squaring scaler 27. At the same time, each blocking oscillator pulse results in the count in the follow-up scaler being increased by "1."

The repeated insertion into the follow-up scaler 25 of a pulse for each injection into the squaring scaler of a number corresponding to the total content in the input storage scaler eventually results in the follow-up scaler 25 having exactly the same condition as the input storage scaler 11. When this happens the comparison circuit 26 produces a "stop pulse" which is conveyed to the squaring gate through conductor 50. The stop pulse ends the square gate pulse thereby open-circuiting "squaring" gate 19. The squaring process is thus terminated as soon as the number "N" has been inserted into the squaring scaler N times. Soon after the squaring gate pulse terminates, the timer in response to the "stop-pulse" generates a reset pulse $d$ (Figure 2), which resets, in a manner later to become apparent, all the stages containing a "1" in the input storage scaler and the follow-up scaler to zero. The apparatus is now ready to repeat the cycle.

It is to be noted that a delay means shown diagrammatically by delay line 29 is provided between each of the first six adjacent squaring scaler stages. The purpose is to enable each succeeding count to progress binary fashion from one scaler stage to the next without interfering with the just previous injection of the blocking oscillator pulses into the appropriate stages as determined by the condition of the input storage scaler and transfer gates.

For example, assume that the binary count of 1010, i.e., $2^0+2^2=5$, is in the input storage scaler. The control potentials through conductors N and P render transfer gates 101 and 103 conducting, and the remaining transfer gates remain non-conducting.

The first blocking oscillator pulse after the beginning of the squaring gate pulse triggers squaring scaler stages 30 and 32 thereby inserting $2^0$ and $2^2$.

The coupling between scaler stages is such that a change from zero to one in any stage does not affect the next stage, but a change from "1" to "0" does trigger the succeeding stage.

The second blocking oscillator pulse causes squaring stages 30 and 32 to change to zero, but now, the output pulse from stage 30 after a slight delay changes stage 31 to a "1" condition and stage 32 in going to zero changes stage 33 to "1" condition. In other words, the state of the squaring scaler becomes 01010, i.e., the count $2^1+2^3=2\times 5$.

The next blocking oscillator pulse results in the insertion of "1's" in stages 30 and 32 and no change in stages 31 and 30 so that the count is now 11110, i.e. $2^0+2^1+2^2+2^3=3\times 5$.

The third blocking oscillator pulse switches stages 30 and 32 to zero and transfer again occurs with respect to stages 31 and 33 so that these stages, after a slight delay, go from "1" to "0" condition and again there is coupling to the corresponding succeeding stages 32 and 34 respectively so that stage 32 becomes a "1" and stage 34 becomes a "1." The count is now 00101, i.e., $2^2+2^4=4\times 5$. It will be noted that in this last sequence stage 32 was actuated first by the fourth pulse from the blocking oscillator and again by the delayed pulse from stage 31.

For the fifth pulse from the blocking oscillator the initial condition of the squaring scaler is 00101, i.e., $2^2+2^4$. Stages 30, 31 and 33 have a "0" and stages 32 and 34 have a "1" condition respectively. The fifth pulse from the blocking oscillator switches stage 30 to a "1" and stage 32 to zero. The switching of stage 32 to zero causes stage 33 to change from "0" to "1" and stage 34 is unaffected. The final condition in binary fashion is 1 0 0 1 1, i.e., $2^0+2^3+2^4=1+8+16=5\times 5$ The five pulses from the blocking oscillator also have been inserted in follow-up scaler 25 which therefore now has exactly the same condition, stage for stage, as the input storage scaler. This condition permits the comparison circuit 26 in response to the next blocking oscillator pulse in line J to generate a stop pulse in line 50 which open circuits squaring gate 19 before the same blocking oscillator pulse "arrives" at the squaring gate through delay line 18.

*The input storage scaler and comparison circuit*

Figure 3 shows the details of the input storage scaler and comparison circuit. In the particular embodiment shown, provision is made for signal pulses having a high rate of input by the utilization of two high speed scaler stages 35 and 36. The remaining cascaded scaler stages are of the simpler type well-known in the art.

The input storage capacity being selected to have a maximum of 64 counts, six cascaded binary scalers 35, 36, 37, 38, 39 and 40 are provided. Scalers 38, 39 and 40 are like scaler 37 and are, for purposes of simplicity, shown in block form.

Input terminals 15 are coupled to input amplifier and inverter gate tube 41. Tube 42 is the input gate control tube. Input gate tube 41 being cathode coupled to stage 42, if the grid of stage 42 is normally held sufficiently positive, gate tube 41 will not respond to positive input pulses because the cathode potential is above cut-off. A negative input gate pulse impressed upon the grid of stage 42 lowers the common cathode potential to a level at which gate tube 41 is just barely cut-off and it will respond to positive input gate pulses. Input tube 41 is coupled to high speed scaler stage 35 which in turn is coupled to the next succeeding scaler stage 36.

The input storage scaler has several functions in addition to accumulating a count during the active interval. It operates to control the transfer gates 23 shown in block form in Figure 1 and in detail in Figure 5. In addition it cooperates with the follow-up scaler 25 shown in detail in Figure 4 to condition the comparison circuit.

Figures 1, 2, 6:
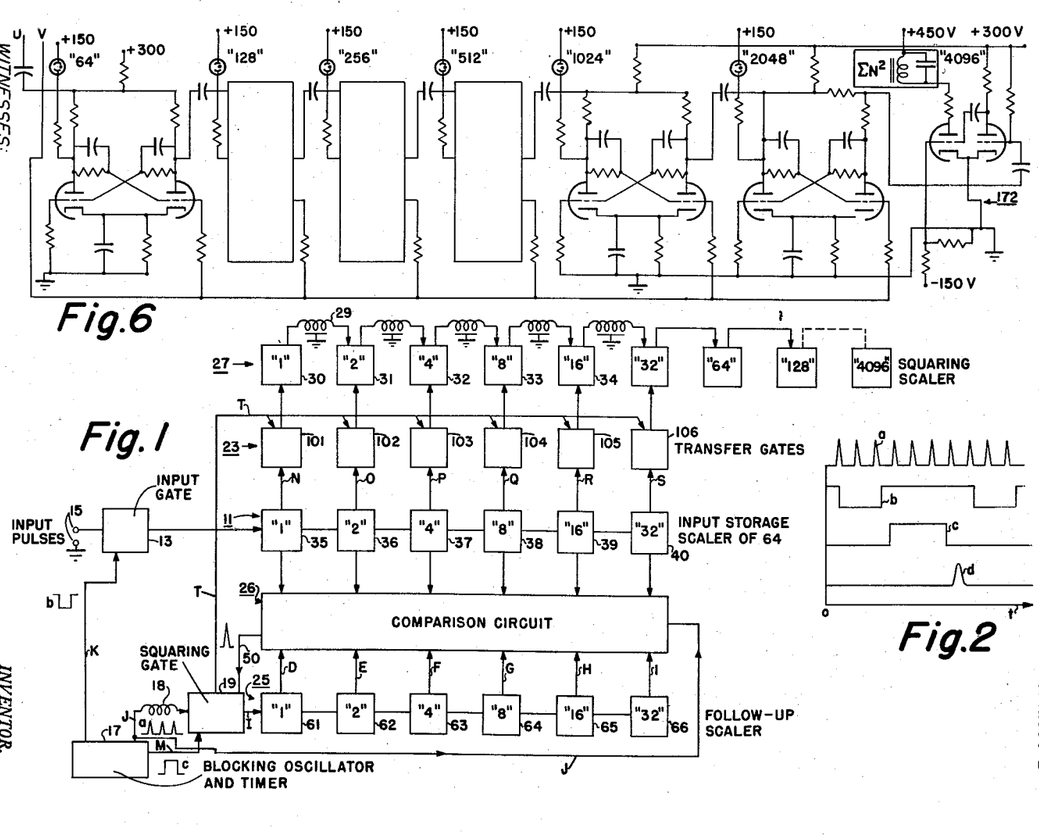
Figure 1 is a block diagram of a preferred embodiment.
Figure 2 is a chart showing the sequence of timing pulses.
Figure 6 is the remainder of the squaring scaler.

The comparison circuit 26 of Figure 1 comprises diodes 43–48 shown in Figure 3. This circuit, in effect is a number of diodes connected in series with respect to the blocking oscillator conductor marked J and to the conductor 50 marked "stop pulse." The diodes can be controlled to become a series open, or a continuous circuit depending respectively upon whether any diode is biased to a non-conducting state with respect to pulses, or every diode is biased to a conducting state with respect to impressed pulses from the blocking oscillator through conductor J. The cathode of each one of the six diodes is direct current coupled through a pulse isolating resistor to a point in the circuitry of a corresponding input storage scaler stage. The anodes of the diodes are connected through conductors C, D, E, F, G and H respectively in like fashion to corresponding points in the follow-up scalers. It follows that, if input storage scaler stage 35 has been triggered so that right hand tube 55 is cut-off, the potential of the cathode of diode 43 is elevated and unless the potential on the anode of diode 43 is also elevated by a similar state in stage 61 in the follow-up scaler, the diode 43 is open circuited and will not permit pulses impressed on conductor 49 to become stop pulses on conductor 50. Conversely, if there is no "1" in an input storage scaler stage and a similar condition pertains to the corresponding stage of the follow-up scaler, the diode is conductive. It follows that as soon as the follow-up scaler, as a result of the squaring operation, assumes a "count" condition exactly similar to the input storage scaler, all the comparison diodes will be conducting and the next pulse on conductor J will become a stop pulse on conductor 50.

*The follow-up scaler*

Conductors N, O, P, Q, R and S leading from potential points in each of the respective input storage scaler stages lead to respective transfer gates in the squaring scaler as shown in Figures 1, 3 and 5.

Any number N represented by the contents of the input storage scaler is added N times in the squaring scaler and at each such entry the binary count in the follow-up scaler increases by one. Since the follow-up scaler has the same number of cascaded binary stages as the input storage scaler, the condition of one will be the same as the other when the number N has been entered in the follow-up scaler.

The follow-up scaler 25 comprises cascaded scaler stages 61–66 shown in detail in Figure 4. In addition this figure contains the squaring pulse gate 19 of Figure 1, and reset pulse generator circuitry for resetting the input storage scaler and the follow-up scaler after the squaring operation.

Conductor J is coupled to a continuous train of blocking oscillator pulses. These pulses are coupled to the first follow-up scaler stage 61 through delay line 18 and normally cut-off squaring gate 19. The blocking oscillator pulses are also coupled from the screen of squaring gate tube 19′ to cathode follower 71 and conductor 73 to conductor T and to the squaring scaler gates 101–106 in a manner presently to become apparent.

The delayed blocking oscillator pulses are passed to the follow-up scaler when a squaring gate pulse raises the potential level of the suppressor grid of tube 19′ to above the cut-off value. Each blocking oscillator pulse advances the count in the follow-up scaler by one until this scaler reaches the same condition as the input storage scaler. Conductors C, D, E, F, G and H connect respectively comparison diode anodes through pulse isolating resistors to points of potential of a higher or lower state of value depending upon the existence of a "0" or "1" respectively in respective follow-up scaler stages. As soon as the follow-up scaler has the same condition as the input storage scaler, all the diodes in the comparison circuit are series conducting to the next undelayed blocking oscillator pulse. The undelayed blocking oscillator pulse is coupled to the right hand diode 48 in the string of diodes by conductor J, as mentioned supra.

The assumption of a condition in the follow-up scaler which is identical with the condition of the input storage scaler, means that the squaring process is completed and must be stopped, and that the input storage scaler and follow-up scaler should be reset.

Tubes 81—82, and 83—84 which are coupled through conductor L to a reset trigger-pulse source shown in Figure 7 in a manner later to become apparent, generate the necessary output reset pulses for the input storage scaler and the follow-up scaler. The reset trigger pulse is applied in parallel to tubes 81 and 83. Reset pulse tube 83 is coupled through manual reset switch 86 to all of the stages in the follow-up scaler, and to the slower stages of the input storage scaler. Reset pulse tube 81 is coupled through reset switch 87 to the high speed scalers of the input storage scaler. Conductor A leading from reset pulse tube 81 is connected to the high speed scaler stages in the input storage scaler shown in Figure 3, conductor B leads to the remainder of the scaler stages in the input storage scaler of Figure 3 as well as to all the stages of the follow-up scaler. Both reset switches 86 and 87 are normally left closed during any single series of runs so that resetting is an automatic operation in response to each reset pulse.

*The squaring scaler*

The transfer gates collectively referred to by numeral 23 of Figure 1 comprise transfer gate tubes 101–106 (shown in detail in Figure 5) respectively connected in the input circuits of squaring scaler stages 30–34 and 114. Each of the gate tubes has a control grid which is direct current coupled to a bias source point in the respective input storage scaler stages 35–40 (Figure 3) through conductors N, O, P, Q, R and S. The control grids of the transfer gates are coupled in parallel through conductor T to the delayed source of blocking oscillator pulses through squaring gate 19 (Figure 4).

A transfer gate is conductive to pulses if its bias connection is connected with an input storage scaler stage having a "1." Consequently after one delayed blocking oscillator pulse has passed through the squaring gate (Figure 4) and acted upon the transfer gates, the condition of the first six stages of the squaring scaler will be exactly the same as the condition of the input storage scaler.

Delayed cascade coupling between each adjacent pair of the first six squaring scaler stages is accomplished by using the "flop" or return pulse of the univibrators 117–121. This type of univibrator is sometimes known as a cathode-coupled gate and is described in the book, Electron Tube Circuits, pages 416–418 by Terman and published by McGraw-Hill Book Co. Delay coupling is provided between the squaring scaler stages so that cascade coupling between successive scaler stages does not interfere with the parallel injection of the blocking oscillator pulse into the appropriate squaring scaler stages. It was pointed out supra, how this process operates with for example an input storage count of 5.

The operation of the detailed squaring scaler is described with reference to Figures 4 and 5.

A count of five, "N" in the binary system is 1010 reading from left to right and is assumed to be stored in the input storage scaler. Consequently transfer gates 101 and 103 are receptive to input pulses and the remaining transfer gates remain biased-off. The first blocking oscillator pulse therefore triggers squaring scaler stages 30 and 32, thereby inserting 1010 (N). The insertion of a "1" in stage 30 for example results in conduction being switched from the right hand to the left hand tube of the scaler stage and so results in issuing a negative pulse. The univibrator 117 is stable with the right hand tube 115 conducting so that a negative pulse on the grid of the left hand tube 114 has no effect on squaring scaler stage 31. Therefore, although stage 30 is triggered by the first pulse, the polarity of the output pulse is such that there is no carry-over into the next squaring scaler stage.

The next pulse from the blocking oscillator resets stages 30 and 32 to "0." This time, delay univibrators 117 and 119 are triggered and the delayed pulses impressed on the cathodes of stages 31 and 33 result in the insertion of "1" in each of these stages. The squaring scaler now is in a state of 01010 or $2+8=10=2\times5$.

The third blocking oscillator pulse changes stage 30 to "1" and stage 32 to "1" so that the resulting count is $11110=2^0+2^1+2^2+2^3=3\times5$.

The fourth blocking oscillator pulse since the beginning of the squaring gate finds the squaring scaler with stages 30, 31, 32 and 33 in "1" condition. The blocking oscillator pulse directly triggers stages 30 and 32 back to "0." Stage 30 in going to zero converts stage 31 to zero by delayed coupling. Stage 32 is reconverted to "1" by delayed coupling from stage 31.

Stage 32 in going back to "0" in direct response to the blocking oscillator pulse had triggered stage 33 to zero and by delayed cascade coupling stage 34 had gone to "1." Therefore the final state is $00101=2^2+2^4=4\times5$.

The fifth blocking oscillator pulse converts stage 30 to a "1" and stage 32 to "0" which by delay coupling changes stage 33 to "1" so that the final state is $10011=2^0+2^3+2^4=5\times5$.

The number of transfer gates and number of scaler stages in the squaring scaler which can be impressed in parallel with the blocking oscillator pulses are the same as the number of scaler stages in the input storage scaler. Although the present embodiment concerns itself with six such stages ("64") any number can be chosen to fit a particular need. The squaring scaler contains, in addition to the gated stages, a like number of cascaded ungated and undelayed stages as shown in Figure 6 in order to provide the capacity selected for this preferred embodiment. In other words, the squaring scaler always has twice the number of stages that the input storage scaler has and the first half (the lower order) of the number of squaring scaler stages are connected through gates to the local source of pulses and these gates are operatively connected to respective ones of all the input storage scaler stages.

The remaining scaler stages in the squaring scaler are cascaded in the usual manner and the last scaler stage is coupled to a register. Each trip of the register indicates the number of times 4096 has accumulated.

The blocking oscillator and timer

The details of the blocking oscillator and timer are explained with reference to Figure 7.

The blocking oscillator 140 is the primary source of pulses for entering a count into the squaring scaler, and to provide the timing sequences for other functions. In order to provide for an adequate input count from nuclear sources which have different rates of activity, the input gate pulse duration is made adjustable. This is accomplished by providing the input-gate generator flip-flop 144, and coupling the same to the blocking oscillator through one, two, or three frequency dividing scalers selectively connected in cascade by switch 160. These frequency divider stages run continuously and independently of the rest of the timer functions.

The reset trigger pulse is generated by reset flip-flop 145 and its input gate tube 156.

The squaring gate pulse is generated by flip-flop 146, its input gate tube 153, and cathode follower 147.

A counting run is terminated by moving switch 164 from "run" to "hold" position. The hold position impresses the suppressor grid of gate tube 156 to a below cut-off negative potential so that the end of the squaring gate pulse is not able to trigger flip-flop 145 to generate a new reset pulse. The last number counted is left showing on the input scaler and the follow-up scaler.

The reset flip-flop 145 is in a condition of right hand conduction, and the right tube of input gate pulse generator 144 is also conducting.

Switch 162 is a two position switch to permit manual resetting of the reset pulse flip-flop 145 to initiate a new counting cycle. In the reset condition which is the up position in the diagram, this switch impresses a negative potential on the grid of the right hand tube of flip-flop 145 thereby switching conduction to the left hand tube. The immediate result is a positive reset pulse I on conductor L and reset pulse generator tubes 81 and 83 (Figure 4) which resets the input storage scaler and the follow-up scaler.

The negative pulse from reset flip-flop 145 coupled to the right hand side of input-gate pulse generator 144 by conductor 170 overrides the pulse conducted to the left side of input gate generator 144 by conductor 163 and sets the input gate generator with right hand conduction and the resulting negative potential from the right side on conducor K is a new input gate pulse.

For purpose of explanation it is assumed that switch 160 is on position 4. All three frequency divider scalers 141, 142, 143 are cascaded between the blocking oscillator and the input gate pulse generator 144. Consequently there is a pulse off the left side of scaler 143 for every 8th oscillator pulse.

The next pulse from frequency divider 143 being negative switches reset pulse generator 145 to right hand conduction, terminates the reset pulse and impresses a negative pulse on the grid of the left hand tube of input gate pulse generator 144. The input gate pulse generator shifts to conduction right side, depresses the potential at the anode and starts the negative input gate pulse. It will be noted that the pulse which riggered the reset pulse generator is also impressed on the grid of the right hand tube of input gate generator 144. However the output pulse from the reset pulse generator on conductor 170 is overriding and accomplishes the triggering of the input gate generator.

The next pulse from the frequency divider is negative on the grid of the right hand tube of the input gate generator, resets it to left hand conduction, and ends the negative input gate pulse on conductor K.

The negative pulse generated at the anode of the left tube of input gate pulse generator 145 triggers the squaring gate pulse generator 146 through conductor 150 thereby switching conduction to the left side and on the right side generating a positive pulse which is impressed through conductor 148 on the grid of cathode follower 147, thereby initiating the positive squaring gate pulse.

The completion of the squaring operation is marked by the generation of the stop pulse by the comparison circuit (Figure 3). This pulse is impressed through conductor 50 on gate tube 153 which in turn impresses a negative pulse on the grid of the left hand tube of the squaring gate generator. This switches conduction to the right hand tube, ending the squaring gate pulse.

At the same time the differentiated positive output pulse off the anode of the left hand tube of squaring gate generator is impressed through conductor 155 on reset pulse generator gate tube 156. The resulting negative pulse on the grid of the right hand tube of reset pulse generator shifts conduction to the left side of the reset pulse generator and the resulting positive pulse on the anode of the right tube is the next reset pulse.

The operation continues to cycle until switch 164 is changed to the hold position. The hold position of this switch prevents the input gate 156 from again triggering reset pulse generator 145 in response to the end of the squaring pulse and so the cycling stops after the last squaring operation is completed.

The registers

It was explained in the early part of this specification that the apparatus must register the number "$n$" of cycles of counting in a run, the number $\epsilon N$ of input pulses for all the cycles, and the summation $\epsilon N^2$ over all the cycles for the sum of the squares of the input pulses for each cycle.

Figure 7:
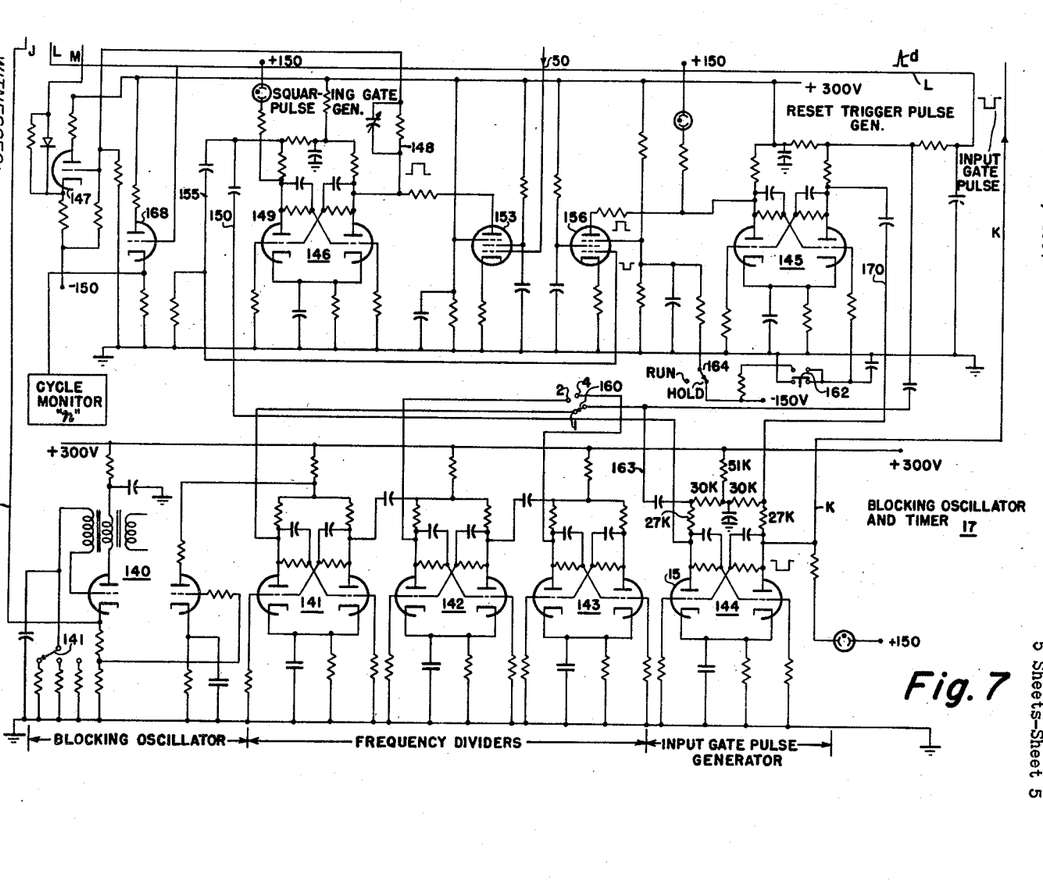
Figure 7 is a schematic diagram of the local oscillator hereinafter termed the blocking oscillator, and a triple gate pulse generator or timer.

The number of cycles "$n$" is provided by coupling a recording register to the reset pulse conductor or bus L through cathode follower 168 as shown in Figure 7.

The total number of pulses counted over all the cycles of a run are counted in $\epsilon N$ register 169 coupled to cathode follower 71 shown in Figure 4.

The $\epsilon N^2$ term is provided by an electric impulse type recorder of any type common in the art having an actuator coil 166. The actuator coil is energized by amplifier 172 coupled to the output of the last stage of the squaring scaler as shown in Figure 6.

It is apparent that $$\frac{\epsilon N}{n}$$

gives the term $\bar{N}$, $$\frac{\epsilon N^2}{n}$$

gives the term $\overline{N^2}$, and arithmetically squaring $\bar{N}$ gives $(\bar{N})^2$. It follows that the apparatus operates to provide all the terms for the utilization of the randomness formula as given in the early part of this specification.

From the foregoing it is seen that what has been described is a counting and numerical squaring device. For purpose of explanation it has been given an input pulse capacity of 64 counts and a squaring capacity of 4096. It is apparent that the apparatus may have a lesser or a greater counting capacity by the selective utilization of the teachings of this specification. Accordingly it is understood that the invention is to be considered limited only by the appended claims taken in view of the prior art.

What is claimed is:

1. Apparatus for indicating the numerical square of a plurality of random-occurring input pulses occurring within a number of selected intervals comprising an input storage scaler having a selected number of cascaded scaler stages, a follow-up scaler having a number of stages equal to the input storage scaler, a comparison circuit coupled between like output circuit points of each input scaler stage and its corresponding follow-up scaler stage, a local pulse source, a squaring scaler comprising a number of cascaded stages equal to twice the number of input storage scaler stages, half of said squaring scaler stages corresponding in order to the order of the input storage scaler stages and having a gated input, means for opening the gated inputs of those squaring scaler stages which correspond to triggered input storage scaler stages, and means coupling said local source of pulses to all of said gates.

2. A computing device for giving the numerical squared value of a random number not exceeding a selected numerical limit of input pulses comprising, an input gate, an input storage scaler, a follow-up scaler, a comparison circuit, a squaring gate and a squaring scaler, said input gate in response to an input gate pulse connecting the input of the input storage scaler to a source of random rate input pulses, said squaring gate coupling the follow-up scaler and a plurality of stages of the squaring scaler to a local source of pulses, said comparison circuit being connected between corresponding potential points of the input storage scaler and the follow-up scaler and being adapted upon the occurrence of equivalency in conducting state between the input storage scaler and the follow-up scaler to emit a stop pulse, means responsive to said stop pulse for successively closing said squaring gate resetting the input storage scaler and follow-up scalers to zero, and generating a new input gate pulse to repeat the cycle.

3. Apparatus for giving the numerical square of a number represented by serially random occurring input pulses, comprising an input storage scaler having a plurality of cascaded stages for counting the input pulses for an interval of selected duration and storing the numerical count in binary fashion, a squaring scaler of twice the number of stages of the input storage scaler, a local source of pulses, gating means connected to the input of each stage of the first half of the number of stages of the squaring scaler and being connected to circuit potential points in corresponding input storage scaler stages and being adapted to open in response to the presence of a "1" in said corresponding input storage scaler stages, means responsive to the end of the input counting interval for coupling said local source of pulses in parallel with said gating means, and means responsive to the occurrence of as many pulses from the local source equal to the count stored in the input storage scaler, for terminating the coupling of said local source of pulses with said gating means.

4. Apparatus for providing the numerical square of a plurality of random-in-time occurring input pulses received during each of a plurality of selected durations comprising an input gate, an input storage scaler having a selected number of scaler stages, a follow-up scaler, a comparison circuit, a squaring gate and a squaring scaler having a number of scaler stages which is twice that of the input storage scaler, and a source of timing gate pulses comprising a cyclically repeating sequentially occurring input-gate pulse, squaring pulse and reset pulse, said input gate coupling the input of the input storage scaler to the source of random occurring input pulses whereby the input storage scaler counts and stores in binary fashion the number of input pulses occurring during the input gate pulse, means responsive to the start of the squaring gate pulse for delaying and coupling a local source of pulses to the follow-up scaler gating means connected to said local source of pulses and to the input of each of the first half of the number of squaring scaler stages, means responsive to the presence of a "1" in stages of the input storage scaler for gating-on the gating means in the inputs of corresponding squaring scaler stages whereby each pulse from the local source of pulses advances the count in the follow-up scaler by one and the count in the squaring scaler by a number equal to the stored number in the input storage scaler, delay means coupling the first half of the number of squaring scaler stages in cascade whereby the counting in the stages of the squaring scaler progresses in the normal cascade manner without interfering with the injection of the count equal to the input storage scaler count by each pulse from the local source of pulses, said comparison circuit being a plurality of diodes serially connected with said local source of pulses, and individually direct current coupled through pulse isolation networks to corresponding voltage shift points of respective input storage scaler stages and follow-up scaler stages, whereby the accumulation in said follow-up scaler of a count corresponding to the count in the input storage scaler causes the comparison circuit to become serially conductive and issue a stop pulse, means responsive to the stop pulse for terminating the squaring pulse and initiating the reset pulse, and means coupled to said sequentially occurring reset pulse for resetting the input storage scaler and the follow-up scaler for the next cycle, register means coupled to the squaring gate for recording the number of cycles, register means connected to the output of the squaring gate for recording the total number of input pulses, and register means connected to the output of the squaring scaler for recording the squared numerical value of the input pulses.

5. A device for counting random-occurring input pulses for a plurality of periodic even intervals and providing an output reading of the number of intervals, and the numerical square of the said number of input pulses counted in the number of intervals comprising, an input storage scaler, a follow-up scaler, a comparison circuit, a squaring scaler, a local source of pulses, an input gate, an input gate opening pulse source, a squaring gate pulse source, and a plurality of transfer gates, said input storage scaler comprising a plurality of cascaded scaler stages, said input gate connected between a source of input pulses and the input of the input storage scaler, means connecting the input gate opening pulse source to said input gate at selected periodic even intervals, said input gate opening pulse source generating pulses, each of duration not exceeding the probable time required for the occurrence of input pulse of number equaling the capacity of the input storage scaler, said squaring scaler having twice the number of cascaded stages as the input storage scaler, said follow-up scaler having a like number of cascaded stages as the input storage scaler, said squaring gate being normally blocked and having an input connected to said local source of pulses and an output connected to the input of the follow-up scaler, and to all the transfer gates, said transfer gates being equal in number to the input storage scaler stages and one each having its output connected to a squaring scaler stage, said transfer gates being normally blocked, means connecting each of said transfer gates to a corresponding input scaler stage condition responsive potential point to unblock any of said gates when the corresponding input scaler stage contains a "1" whereby said squaring scaler assumes a count equal to the count in the input storage scaler in response to each pulse from the local pulse source and the follow-up scaler increases its count by one for each pulse from the local pulse source, a comparison circuit comprising a plurality of diodes, one each of which is connected between corresponding output potential points of an input storage scaler stage and a follow-up scaler stage and said diodes being serially connected to the local source of pulses, and to said squaring gate whereby the accumulation of a count in the follow-up scaler similar to the count in the input storage scaler results in serial conductivity of said diodes to the next succeeding pulse from the local sources of pulses, means for impressing the next succeeding pulse to the squaring gate pulse source to terminate the squaring pulse and reblock the squaring gate, and reset trigger pulse generating means responsive to the squaring gate pulse source for resetting to a no-count condition, the input storage scaler and the follow-up scaler, numerical register means connected to the output of the squaring scaler, and numerical register means coupled to the reset trigger pulse generator to thereby provide a record of the numerically squared number of input pulses and the number of counting intervals.

6. A device for cyclically counting random-occurring pulses for a plurality of even intervals and indicating the numerical sum of the intervals and the numerical squared value of the sum of random-occurring pulses for said plurality of even intervals comprising an input storage scaler, input gating means connecting said input storage scaler to a source of random-occurring pulses, an input gate opening pulse source, means connecting the input gate opening pulse source to the input gate whereby during the generation of a gate opening pulse, random-occurring pulses are admitted into the input storage scaler, a squaring gate, a squaring scaler, and a local source of pulses, means responsive to the input gate opening pulse source at the termination of the input gate pulse for generating a squaring gate opening pulse, transfer gate means connected in parallel to the source of local pulses during a squaring gate pulse, trigger means connected to each of said transfer gates and a condition responsive potential point of a corresponding input scaler stage, output means connecting each of said transfer gate means to a squaring scaler stage of the same order as that of the input scaler stage to which the respective transfer gate trigger means in connected, said transfer gate means admitting local pulses to the respective squaring scaler stage when the corresponding input scaler stage is in a "1" condition, whereby each local source pulse inserts in the squaring scaler a numerical quantity in binary notation equal to the total stored count in the input storage scaler, follow-up scaler means having as many cascaded stages as the input storage scaler and having an input connected to the source of local pulses through the squaring gate, means connected between the follow-up scaler and the input storage scaler for terminating the squaring gate pulse when the follow-up scaler attains a condition similar to the input storage scaler, first numerical register means coupled to the squaring gate opening pulse source and second numerical register means coupled to the output of the squaring scaler whereby the number of counting cycles and the total numerical square value of the random-occurring pulses occurring over all of the cycles are indicated.

7. The device of claim 6 in which a reset pulse generator is coupled to the squaring gate pulse source responsive to the termination of the squaring pulse to provide a reset pulse, and means coupling the reset pulse generator to the input storage scaler and the follow-up scaler to zero condition at the termination of the squaring cycle.

References Cited in the file of this patent

UNITED STATES PATENTS

| 2,641,407 | Dickinson | June 9, 1953 |
| 2,672,284 | Dickinson | Mar. 16, 1954 |
| 2,726,038 | Ergen | Dec. 6, 1955 |